May 31, 1938.　　　J. K. SCHAEFER　　　2,119,294
BATTERY TERMINAL CLAMP
Filed Sept. 14, 1936　　　3 Sheets-Sheet 1

Inventor
J. K. Schaefer
By Clarence A. O'Brien
Hyman Berman
Attorneys

May 31, 1938.   J. K. SCHAEFER   2,119,294
BATTERY TERMINAL CLAMP
Filed Sept. 14, 1936   3 Sheets-Sheet 2

Inventor
J. K. Schaefer
By Clarence A. O'Brien
Hyman Berman
Attorneys

May 31, 1938. J. K. SCHAEFER 2,119,294
BATTERY TERMINAL CLAMP
Filed Sept. 14, 1936 3 Sheets-Sheet 3
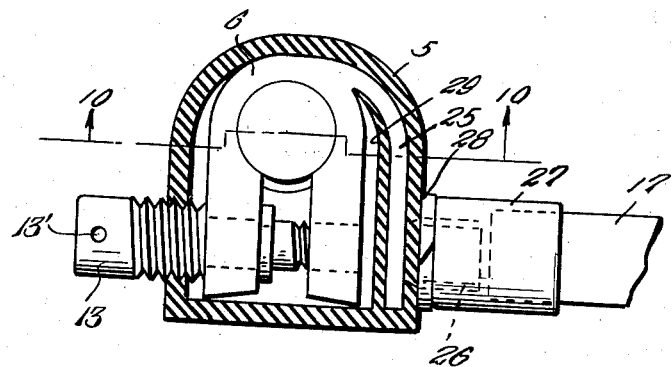
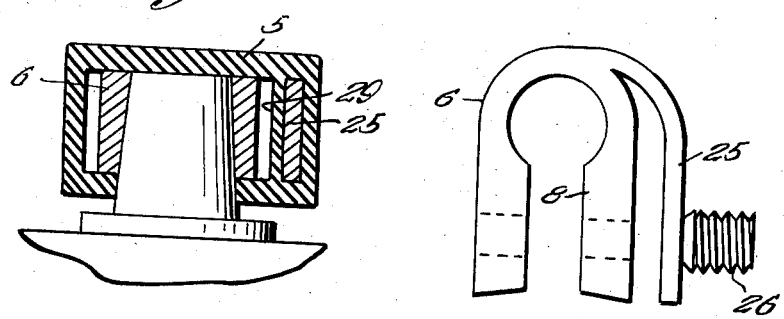
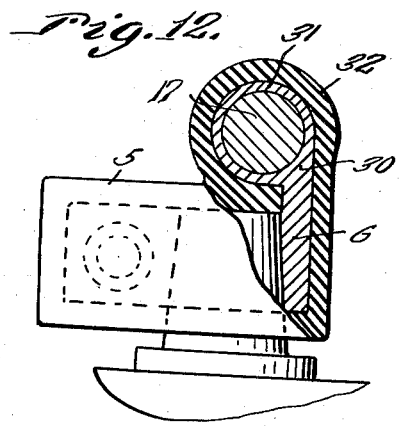
Inventor
J. K. Schaefer
By Clarence A. O'Brien
Hyman Berman
Attorneys Patented May 31, 1938

2,119,294

UNITED STATES PATENT OFFICE 2,119,294

BATTERY TERMINAL CLAMP

Joseph K. Schaefer, Hollywood, Calif.

Application September 14, 1936, Serial No. 100,715

2 Claims. (Cl. 173—259)

This invention relates to storage battery terminal clamps, and more particularly to a split type of clamp for electrically connecting an electrical conductor to a battery terminal post.

The present invention involves certain new and useful improvements over the battery clamp forming the subject matter of an application filed by me under date of April 23, 1935, bearing Serial No. 17,847, and entitled "Battery terminal clamp", matured into Patent 2,041,966.

Among the objects of the present invention are, first, to provide a battery terminal clamp of the split type, which has the apertured lugs thereof movable; secondly, to provide a battery terminal clamp which has the entire clamp covered with a single solid piece of stretchable acid resisting material, providing a single hole capable of receiving the tapered battery post; thirdly, to provide a battery terminal clamp having a more simple but positive spreading means than heretofore devised; fourthly, to provide a battery terminal clamp having a positive means for making the clamp covering absolutely air tight; fifthly, to provide a battery terminal clamp which can be made with either stationary or detachable cable outlet connections; sixthly, to provide a battery terminal clamp which contains a number of different positioned cable outlets; and lastly, to provide a battery terminal clamp containing less parts and manufacturing operations, and which will consequently be more economically manufactured.

The invention, together with its objects and advantages will be best understood from a study of the following description taken in connection with the accompanying drawings, wherein:

Figure 9 is a sectional view through a third form of clamp.

Figure 10 is a sectional view taken substantially on the line 10—10 of Figure 9.

Figure 11 is a plan view of the third form of clamp with the cover removed.

Figure 12 is a view of a fourth form of clamp, certain parts being broken away and shown in section.

Figure 1:
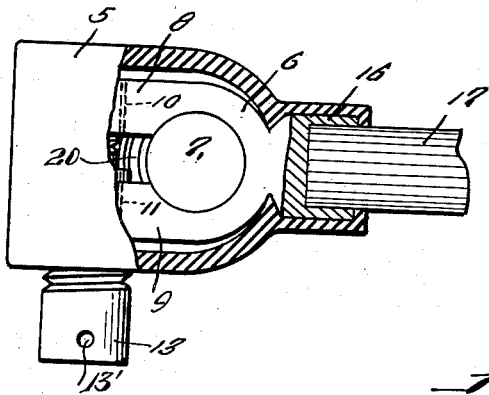
Figure 1 is a top plan view of one form of clamp with certain parts broken away and shown in section.
Figure 4:
Figure 4 is a perspective view of a pinch plate.
Figure 2:
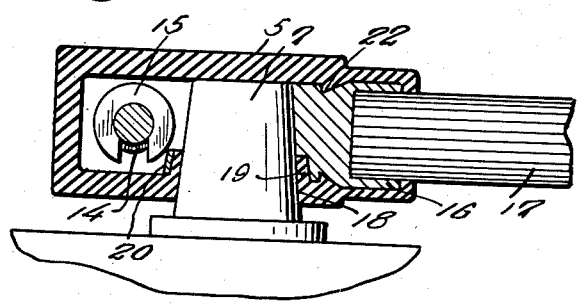
Figure 2 is a sectional view through the clamp.
Figure 3:
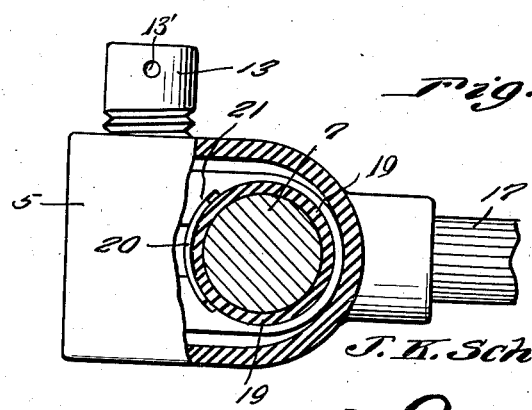
Figure 3 is a view partly in section and partly in elevation illustrating certain details of the clamp.

Referring to the drawings by reference numerals, and particularly to the form of the invention shown in Figures 1 to 3, inclusive, it will be seen that the clamp comprises a cover member 5, which consists of a single solid piece of stretchable, acid resisting material, and presenting a shell-like cover having top, bottom, and peripheral walls. Confined within the cover 5 is a split clamp member 6 adapted to embrace the battery post 7, as shown, and having its ends formed with apertured lugs 8 and 9, respectively. One of the lugs, for example, the lug 8, is provided with a threaded aperture 10, while the other lug is provided with an aperture 11 that is smooth and unthreaded and is in alinement with a threaded opening 12 provided in the peripheral wall of the cover 5.

Threaded through the opening 12 in the cover 5 is the enlarged threaded portion of a bolt 13, which bolt has a reduced shank portion having a non-threaded or smooth section working in the opening 11 in the lug 9 and a threaded section working in the threaded opening 10 in the lug 8. The smooth non-threaded portion of the shank or bolt 13 is also provided with a peripheral groove 14 in which is engaged a split washer 15 which is adapted to bear against the inner side of the lug 9 in a manner to cause the lugs 8 and 9 to spread apart upon rotation of the bolt 13 in one direction, whereby to expand the clamp 6 to permit ready removal of the clamp and cover 5 as a unit from the battery post 7. The head of bolt 13, as shown in Figures 1, 3, 5, 6 and 9 is provided with a transverse opening 13 to receive a suitable instrument for use as a handle to facilitate the turning of the bolt.

The clamp 6 has integral therewith, and at a point diametrically opposite to the space between the lugs 8 and 9, a socketed boss 16 for receiving one end of the cable 17 which is welded or otherwise secured within the socket. The cover 5 is extended at one end thereof so as to cover the boss 16, as shown. Also, at the extension thereof provided for covering the boss 16, the cover 5 is provided with a suitable internal wall structure 17 to snugly embrace the clamp 6 at the junction of the clamp and boss 16, as will be clear from a study of Figures 1 and 2.

To insure the clamp covering 5 being air tight, there is provided internally of the cover and about the opening 18 provided in the bottom wall of the cover to receive the battery terminal post 7, an integral annular upstanding flange 19 that contracts about the post 7. To prevent pinching of the flange 19 incidental to a tightening of the clamp 6 about the post 7, there is provided an arcuate or longitudinally curved pincher or protector plate 20 that fits about the flange 19 to bridge the space between the lugs 8 and 9 of the clamp, the respective opposite ends of the plate 20 being accommodated in suitable notches 21 provided therefor at the junction of the body of the clamp 6 and lugs 8 and 9.

Figure 5:
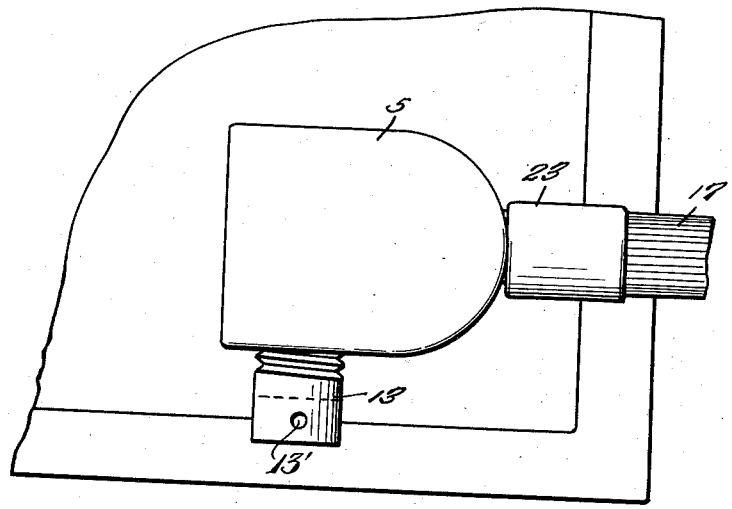
Figure 5 is a top plan view illustrating a slightly modified form of clamp.
Figure 6:
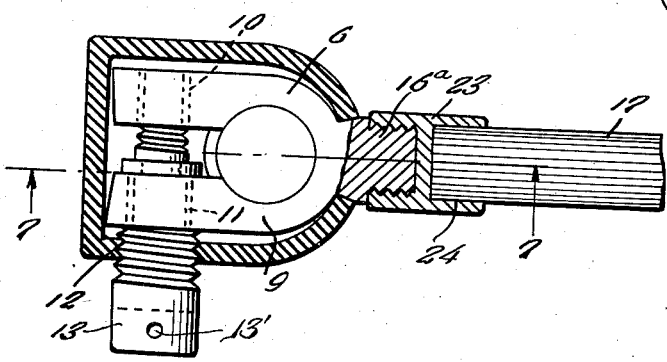
Figure 6 is a horizontal sectional view through the clamp shown in Figure 5.
Figure 8:
Figure 8 is a plan view of a split washer.
Figure 7:
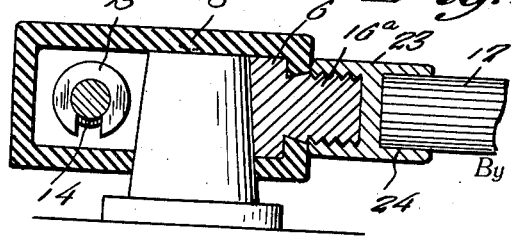
Figure 7 is a detail sectional view taken substantially on the line 7—7 of Figure 6.

The form of the invention shown in Figures 5 to 7, inclusive, differs from that shown in Figures 1 to 3, inclusive, and just described, only in so far as the connection between the clamp 6 and the cable 17 is concerned. In the second form of the invention shown in Figures 5 to 7, inclusive, the body of the clamp 6 has formed integral therewith a threaded boss or projection 16a on which is threaded one end of a cylindrical coupling member 23, the other end of which is provided with a socket 24 which has secured therein one end of the cable 17. Thus, it will be seen that a quick detachable connection between the clamp 6 and the cable 17 is provided in this second form of the invention.

In the third form of the invention shown in Figures 9 to 11, inclusive, instead of providing, as in the form of the invention shown in Figures 1 to 3, inclusive, a socketed boss 16, or as shown in the form of the invention illustrated in Figures 5 to 7, inclusive, a detachable connection between the clamp 6 and the cable 17, the clamp 6 has formed integral therewith an extension 25 which is integral with the clamp 6 at the closed end of the clamp and extends laterally from the clamp and then parallel to one of the lugs, for example the lug 8, of the clamp, being substantially coextensive with said lug 8. The extension 25 has integral therewith and extending laterally therefrom a threaded pin 26 to which is threadedly engaged one end of a coupling sleeve 27 that is identical in construction with the coupling sleeve 23 and serves to electrically connect the cable 17 with the clamp. Also, there is interposed between the end of the coupling sleeve 27 threadedly engaged with the pin 26 and the adjacent side of the peripheral wall of the cover 5 a split washer 28.

Also, to accommodate the form of clamp shown in Figures 9 to 11, the cover 5 is slightly modified to the extent that it has its peripheral wall provided with a suitable opening through which the pin 26 extends, and is also provided internally with a partition wall 29 that is somewhat coextensive to the extension 25 of the clamp and cooperates with the peripheral wall of the cover 5 to receive the extension 25 in a manner clearly shown in Figure 9.

In the form of the invention shown in Figure 12, the clamp 6 is modified to the extent that at the closed end thereof said clamp is provided with an upstanding integral web 30 that is formed integral with a cable end-receiving socket or sleeve 31. To accommodate the web 30 and the sleeve 31, the cover 5 has its top wall and the rear portion of its peripheral wall formed integral with a substantially cylindrical formation 32, as clearly shown in Figure 12.

From the above it will be seen that I have provided a battery terminal clamp which may be readily and easily applied to a battery post, and which, through the medium of the cover member associated therewith a substantially air tight connection is provided which will eliminate corrosion, to the end that the clamp may be readily removed from the post even after being associated with the post over a considerable period of time.

It is thought that the construction, utility and advantages of a battery clamp embodying the features of the present invention will be appreciated without a more detailed description thereof.

Having thus described the invention, what is claimed as new is:

1. In a battery terminal connection, a battery terminal clamp adapted to fit down on, and to securely embrace a battery terminal post, a cover of elastic, acid resisting material of hollow shell-like structure enveloping said clamp and having a bottom wall provided with an aperture through which the battery post extends into the cover to be engaged by said clamp, said clamp having an integral extension parallelling one side thereof confined within said cover, and said extension having a threaded pin projecting laterally outwardly through an opening in the cover, and a conductor having a member on one end thereof threadedly engaged with said pin to provide a quick detachable connection between the clamp and said conductor; and said cover having an internal wall terminating short of one end of the cover and accommodated between said clamp extension and an adjacent side of said clamp.

2. In a battery terminal connection, a battery terminal clamp adapted to fit down on, and to securely embrace a battery terminal post, a cover of elastic, acid resisting material of hollow shell-like structure enveloping said clamp and having a bottom wall provided with an aperture through which the battery post extends into the cover to be engaged by said clamp, said clamp having an integral extension parallelling one side thereof confined within said cover, said extension having a threaded pin projecting laterally outwardly through an opening in the cover, a conductor having a member on one end thereof threadedly engaged with said pin to provide a quick detachable connection between the clamp and said conductor, and said hood having an internal partition wall providing with the outer wall of said cover a compartment for the clamp projection.

JOSEPH K. SCHAEFER.